United States Patent [19]

Woodland

[11] Patent Number: 4,571,230
[45] Date of Patent: * Feb. 18, 1986

[54] ENDLESS POWER TRANSMISSION BELT HAVING A TOOTHED COMPRESSION SECTION AND METHOD OF MAKING THE SAME

[75] Inventor: Carl R. Woodland, Springfield, Mo.

[73] Assignee: Dayco Corporation, Dayton, Ohio

[*] Notice: The portion of the term of this patent subsequent to Apr. 9, 2002 has been disclaimed.

[21] Appl. No.: 698,041

[22] Filed: Feb. 4, 1985

Related U.S. Application Data

[60] Division of Ser. No. 647,853, Sep. 4, 1984, Pat. No. 4,509,938, which is a continuation of Ser. No. 303,255, Sep. 17, 1981, abandoned.

[51] Int. Cl.$^4$ .......................... F16G 5/00; F16G 1/00; F16G 9/00
[52] U.S. Cl. .................................. 474/264; 474/265; 474/263
[58] Field of Search .............. 474/265, 264, 263, 262, 474/261, 251, 250, 249

[56] References Cited

U.S. PATENT DOCUMENTS

| | | | |
|---|---|---|---|
| 2,417,512 | 3/1947 | Nassimbene | 474/263 |
| 3,164,026 | 1/1965 | Terhune | 474/263 |
| 3,473,989 | 10/1969 | Richmond | 156/138 |
| 3,479,882 | 11/1969 | Ciognani | 474/265 X |
| 3,566,706 | 3/1971 | Fix | 474/265 |
| 3,839,116 | 10/1974 | Thomas et al. | 474/263 X |
| 3,863,516 | 2/1975 | Fisher et al. | 474/264 X |
| 3,919,892 | 11/1975 | Ballou | 474/265 X |
| 3,968,703 | 7/1976 | Bellmann | 474/265 X |
| 3,981,206 | 9/1976 | Miranti, Jr. et al. | 474/264 X |
| 3,987,684 | 10/1976 | Fisher et al. | 474/263 X |
| 3,995,507 | 12/1976 | White et al. | 474/263 |
| 4,031,768 | 6/1977 | Henderson et al. | 474/265 |
| 4,083,261 | 4/1978 | Speer et al. | 474/263 |
| 4,188,832 | 2/1980 | Henderson | 474/264 |
| 4,255,146 | 3/1981 | Standley | 474/265 |
| 4,299,588 | 11/1981 | Standley | 474/264 |
| 4,509,938 | 4/1985 | Woodland | 474/265 |

*Primary Examiner*—Lawrence J. Staab
*Assistant Examiner*—Michael D. Bednarek
*Attorney, Agent, or Firm*—Joseph V. Tassone

[57] ABSTRACT

An endless power transmission belt having a toothed compression section and method of making the same are provided, the belt being formed substantially of polymeric materials and comprising a tension section, a compression section, and a load-carrying section disposed between the tension section and the compression section and having a transverse centerline, the compression section having an outer layer and an inner layer joined to the outer layer and defining an interface therewith that is substantially uniformly spaced from the load-carrying section by the outer layer throughout substantially the entire width and length of the belt. The compression section has an inner surface in the form of alternating transverse teeth and grooves with the grooves respectively defining the roots of the teeth. The inner layer of the compression section is softer than the outer layer thereof and the roots of the teeth are spaced inwardly from the interface of the layers so that the root of each tooth is spaced from the interface of the layers a distance that is approximately 25% of the distance of that tooth from the centerline of the load-carrying section whereby the inner layer tends to prevent cracking of the belt in the toothed area thereof.

18 Claims, 4 Drawing Figures

U.S. Patent     Feb. 18, 1986     4,571,230
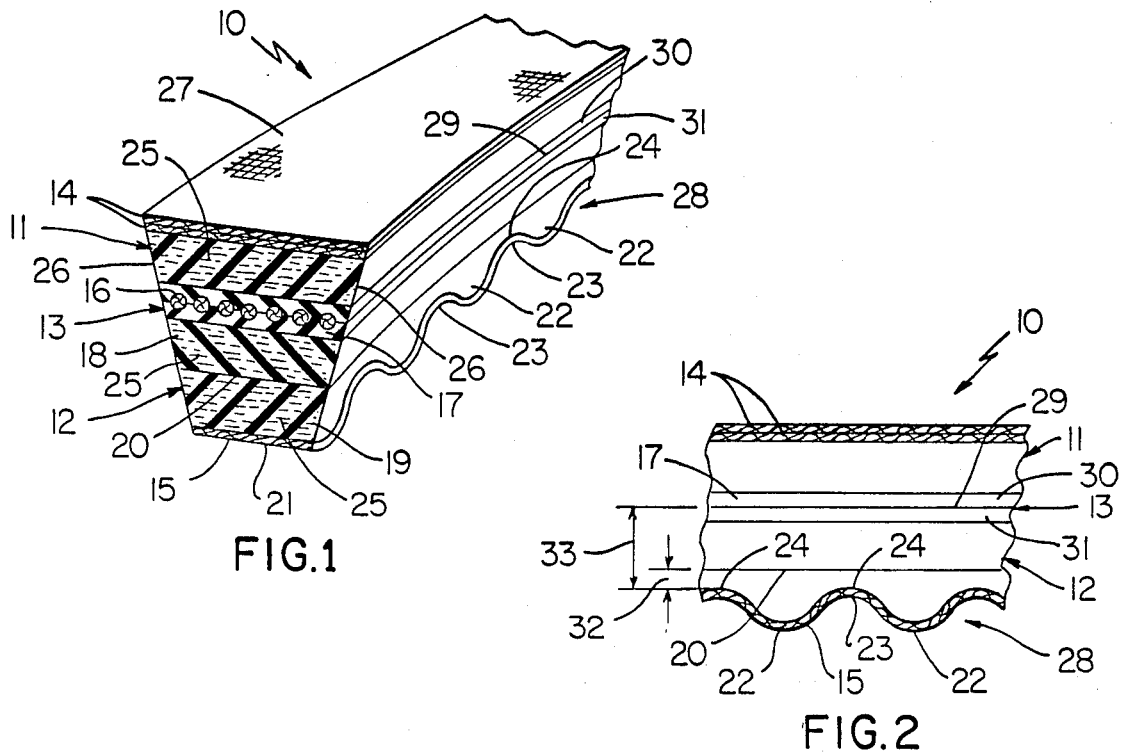
FIG.1
FIG.2
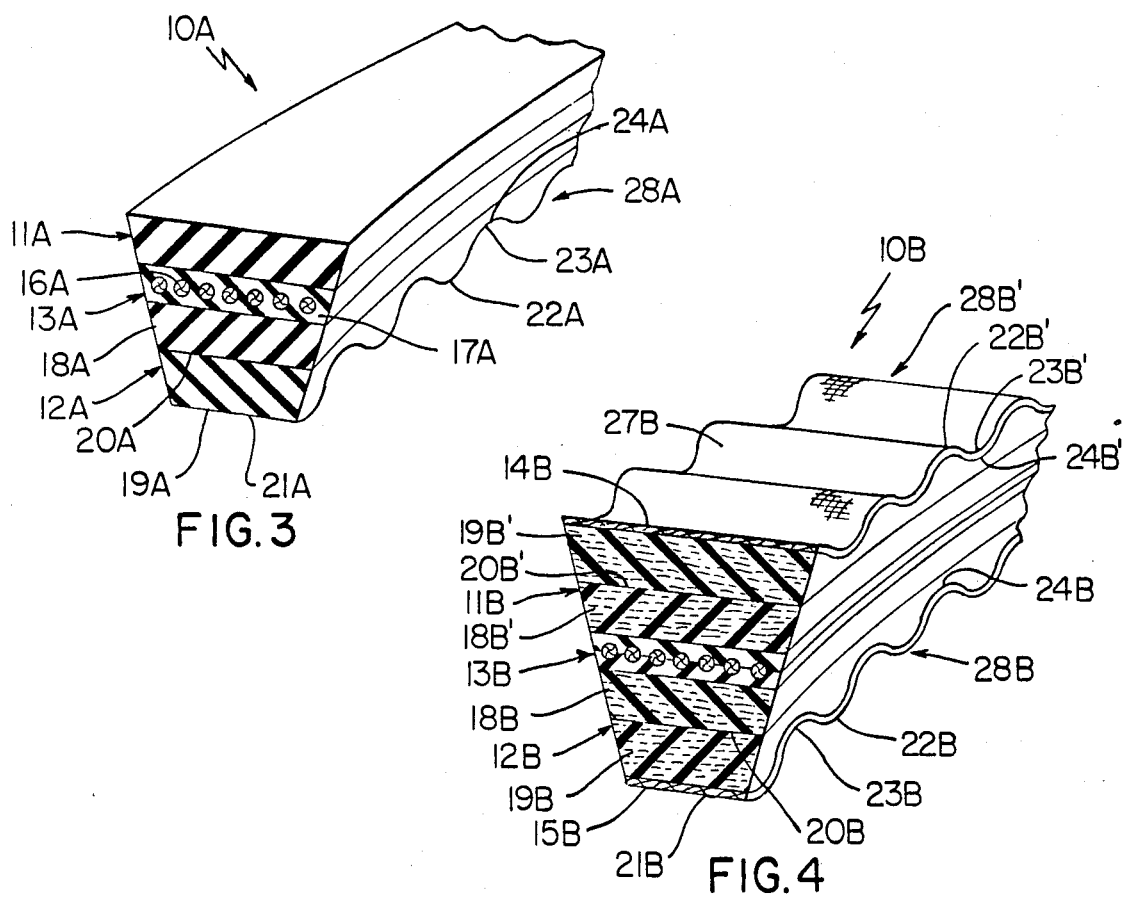
FIG.3
FIG.4

ENDLESS POWER TRANSMISSION BELT HAVING A TOOTHED COMPRESSION SECTION AND METHOD OF MAKING THE SAME

CROSS REFERENCE TO RELATED APPLICATION

This application is a divisional patent application of its copending parent patent application, Ser. No. 647,853, filed Sept. 4, 1984, now U.S. Pat. No. 4,509,938 which, in turn, is a continuation patent application of its copending parent patent application, Ser. No. 303,255, filed Sept. 17, 1981, now abandoned in favor of its continuation patent application.

BACKGROUND OF THE INVENTION

1. Field of the Invention

This invention relates to an improved endless power transmission belt having a toothed compression section and to a method of making the same.

2. Prior Art Statement

It is known to provide an endless power transmission belt having a toothed compression section wherein the belt is formed substantially of polymeric materials and comprises a tension section, a compression section, and a load-carrying section disposed between the tension section and the compression section, the compression section having an outer layer and an inner layer joined to the outer layer and defining an interface therewith that is substantially uniformly spaced from the load-carrying section by the outer layer throughout substantially the entire width and length of the belt and with the compression section having an inner surface in the form of alternating transverse teeth and grooves with the grooves respectively defining the roots of the teeth.

For example, see the following United States patent:

(1) U.S. Pat. No. 3,995,507—White et al

It appears that the endless power transmission belt of item (1) above has the roots of the teeth extending to the outer layer of the compression section thereof.

It is also known to form the inner layer of the toothed compression section of an endless power transmission belt of a softer compound than the outer layer thereof to tend to prevent cracking in the toothed area of the belt.

For example, see the following copending patent application:

(2) U.S. Ser. No. 232,326, filed Feb. 6, 1981—Miranti, Jr.

It appears that the interface between the inner and outer layers in the toothed compression section in the belt of item (2) above is substantially the same as the contour of the alternating teeth and grooves of the inner surface of the compression section of the belt.

It is also known to provide a soft rubber layer between the inner and outer layers of the compression section of an endless power transmission belt that has a toothed compression section.

For example, see the following U.S. Patent:

(3) U.S. Pat. No. 3,473,989—Richmond.

It appears that the endless transmission belt of item (3) above has the roots of the teeth thereof extending to an intermediate soft rubber layer disposed between the inner layer and outer layer of the compression section thereof, the soft intermediate layer tending to prevent cracks in the toothed area from reaching the outer layer of the compression section thereof.

It is also known to provide a fabric layer between the inner layer and outer layer of the toothed compression section of an endless power transmission belt in order to tend to prevent cracks in the toothed area from reaching the outer layer of the compression section.

For example, see the following U.S. Patent:

(4) U.S. Pat. No. 4,188,832—Henderson.

It is also known to provide two or more layers in the non-toothed compression section of an endless transmission belt wherein the inner layer is softer than the outer layer of the compression section.

For example, see the following two United States Patents:

(5) U.S. Pat. No. 2,417,512—Nassimbene.

(6) U.S. Pat. No. 3,164,026—Terhune.

SUMMARY OF THE INVENTION

It is one feature of this invention to provide an improved endless power transmission belt having a toothed compression section.

In particular, it was found according to the teachings of this invention that an on-going problem with raw edge belts of the cog-tooth type utilized in agricultural adjustable speed and industrial variable speed applications have been cracking or separating in the compression sections of the respective belts, this cracking usually beginning in the toothed area of each belt and being the result of high bending and compressive stresses in the toothed area and/or of torque flexing of each tooth itself. The cracking is enhanced by the use of rubber compounds with high compressive modulus of elasticity in the compression sections of these belts. This high compressive modulus is necessary to prevent belt "dishing" and "squashing" under tension as adjustable speed and variable speed cross sections are of necessity relatively wide and shallow (low aspect ratio) to achieve speed variation. A compound with a high compressive modulus also has a high bending modulus and will generally have a high Shore A durometer hardness, both of these characteristics contributing to premature cracking.

Prior attempts have been made to prevent the cracks from propagating from each tooth of the belt to the upper compression section of the respective belt but such attempts have not addressed the initial formation of the cracks, and, in some cases, the compound in the teeth of the belt has purposely been made harder than the upper compression section thereof. Also, a "crack barrier" of very soft compound without stiffening fibers has been included between the two areas in the compression section of the belt to prevent the cracks from progressing from the teeth to the upper compression section.

However, it was found according to the teachings of this invention that if the inner layer of the compression section of the power transmission belt having a toothed compression section is a softer or better flexing compound than the outer layer of the compression section and the roots of the teeth are spaced inwardly from the interface between the two layers of the compression section that is substantially uniformly spaced from the load-carrying section by the outer layer throughout substantially the entire width and length of the belt, the inner layer will tend to prevent cracking of the belt in the toothed area thereof.

For example, one embodiment of this invention provides an endless power transmission belt having a toothed compression section, the belt being formed substantially of polymeric materials and comprising a tension section, a compression section, and a load-carrying section disposed between the tension section and the compression section and having a transverse centerline, the compression section having an outer layer and an inner layer joined to the outer layer and defining an interface therewith that is substantially uniformly spaced from the load-carrying section by the outer layer throughout substantially the entire width and length of the belt. The compression section has an inner surface in the form of alternating transverse teeth and grooves with the grooves respectively defining the roots of the teeth. The inner layer of the compression section has a thickness from the interface to the tips of the teeth thereof that is approximately the same as the thickness of the outer layer of the compression section. The inner layer of the compression section is softer than the outer layer thereof and the roots of the teeth are spaced inwardly from the interface of the layers whereby the inner layer so that the root of each tooth is spaced from the interface of the layers a distance that is approximately 25% of the distance of that root from the centerline of the load-carrying section tends to prevent cracking of the belt in the toothed area thereof.

Accordingly, it is an object of this invention to provide an improved endless power transmission belt having a toothed compression section, the belt of this invention having one or more of the novel features of this invention as set forth above or hereinafter shown or described.

Another object of this invention is to provide a method of making such an endless power transmission belt, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view illustrating one embodiment of an endless power transmission belt of this invention.

FIG. 2 is a fragmentary side view of the belt of FIG. 1.

FIG. 3 is a view similar to FIG. 1 and illustrates another embodiment of an endless power transmission belt of this invention.

FIG. 4 is a view similar to FIG. 1 and illustrates another embodiment of an endless power transmission belt of this invention, the belt of FIG. 4 being a central neutral axis (CNA) belt.

DESCRIPTION OF THE PREFERRED EMBODIMENTS

While the various endless power transmission belts of this invention are hereinafter described and illustrated as having particular materials and dimensions, it is to be understood that the various features of this invention can be utilized singly or in any combination thereof to provide belts with other materials and dimensions as desired.

Therefore, this invention is not to be limited to only the embodiments illustrated in the drawings, because the drawings are merely utilized to illustrate some of the wide variety of arrangements of this invention.

Referring now to FIGS. 1 and 2, and endless power transmission belt of the cog-tooth type of this invention is generally indicated by the reference numeral 10 and it is formed substantially of polymeric materials as is well known in the art and comprises a tension section 11, a compression section 12 and a load-carrying section 13 disposed between the tension section 11 and the compression section 12. The belt 10 also has two outside plies or layers of fabric 14 and an inner ply or layer of fabric 15, each fabric layer 14 and 15 being made from a nonwoven, woven, or knitted fabric and being bonded to its associated section in a manner well known in the art.

The load-carrying section 13 of the belt 10 has load-carrying means in the form of a helically wound load-carrying cord 16 which is suitably embedded in a polymeric cushion or matrix 17 in accordance with techniques which are well known in the art, the helically wound cord being made of any suitable material known and used in the art and the polymeric cushion or matrix 17 being a single layer or a double layer as illustrated in the drawings and as well known in the art.

The compression section 12 of the belt 10 is formed from an outer layer 18 and an inner layer 19 secured to the outer layer 18 and thereby defining an interface 20 therewith, the interface 20 being substantially uniformly spaced inwardly from the load-carrying section 13 by the outer layer 18 throughout substantially the entire width and length of the belt 10.

The compression section 12 of the belt 10 has the inner surface 21 thereof provided in the form of alternating transverse teeth 22 and grooves 23 formed in a manner well known in the art, the grooves 23 respectively defining the roots of the teeth 22 with the deepest point of the root being designated by the reference numeral 24 in FIGS. 1 and 2.

The tension section 11 and compression section 12 have a plurality of randomly arranged fibers embedded in the compounds thereof with the axes of the fibers being disposed substantially transverse to the longitudinal axis of the belt 10 in a manner well known in the art, a representative few of such fibers being designated by the same reference numeral 25 in the drawings.

The outer layer 18 of the compression section 12 is graphite loaded in order to tend to reduce friction at the non-parallel sides 26 of the belt 10 which has a generally trapezoidal cross-sectional configuration as illustrated in FIG. 1 and formed in a manner well known in the art wherein the bottom surface 21 of the belt 10 is generally parallel to the top surface 27 thereof.

As previously stated, it is one feature of this invention to tend to prevent cracking in the toothed area of the belt 10, the toothed area thereof being generally indicated by the reference numeral 28 and such cracking therein would normally take place in prior known toothed belts at the teeth and/or roots thereof because of the excess bending and compression therein required as the belt passes around pulleys and the like as is well known in the art.

However, it was found according to the teachings of this invention that if the inner layer 19 of the compression section 12 is formed of a softer material than the outer layer 18 and the roots 24 of the teeth 22 are spaced inwardly from the interface 20 between the layers 18 and 19, the tendency of the toothed area 28 of the belt 10 to crack is materially reduced.

For example, one embodiment of an endless power transmission belt 10 of the toothed type illustrated in FIGS. 1 and 2 of this invention that prevents such cracking comprises an inner layer 19 of a polymeric compound formed substantially of neoprene having a compressive modulus of approximately 2200 psi, a bending modulus of approximately 1700 psi, a Shore A durometer hardness of approximately 85, and a thickness of approximately 0.300 of an inch. The outer layer 18 utilized in combination therewith comprises a polymeric material formed substantially of neoprene having a compressive modulus of approximately 2600 psi, a bending modulus of approximately 2200 psi, a Shore A durometer hardness of approximately 90, and a thickness of approximately 0.280 of an inch. Such belt 10 has a length of approximately 91.500 inches, a width at the top 27 thereof of approximately 2.000 inches and a thickness of approximately 0.850 of an inch.

The inner layer 19 of such embodiment of the belt 10 has the fibers 25 thereof of an average length of approximately ¼ to ⅜ of an inch and are approximately 0.030 of an inch in diameter while approximately 50% thereof are formed from nylon and approximately 50% thereof are formed of polyester. In contrast, the fibers 25 of the outer layer 18 are formed from a combination of flocking and relatively long fibers similar to the fibers in the inner layer 19. However, the total number of fibers 25 in the outer layer 18 having a length similar to the length of the fibers 25 in the inner layer 19 is less than the total number of such length fibers 24 in the inner layer 19. For example, the length of the flocking in the outer layer 18 is approximately 0.01 of an inch to 0.10 of an inch and all are formed from nylon while the longer fibers are also all formed of nylon and are of an average length of ¼ to ⅜ of an inch in length and approximately 0.030 of an inch in diameter.

As previously stated, only the outer layer 19 is graphite loaded so that the inner layer 19 does not contain any graphite therein.

With such an arrangement of the inner and outer layers 19 and 18 formed as above, it has been found according to the teachings of this invention that each root point 24 should be spaced from the interface 20 between the outer layer 18 and the inner layer 19 approximately 25% of the total distance of the root 24 to the medial point in the load carrying section 13 which in the example illustrated in FIGS. 1 and 2 comprises the interface 29 between the two layers 30 and 31 that make up the polymeric cushion or matrix 17 of the load-carrying section 13 in a manner well known in the art.

In particular, it can be seen in FIG. 2 that the distance indicated by the reference numeral 32 is between the root 24 and the interface 20 and is approximately 25% of the distance indicated by the reference numeral 33 that extends between a root 24 and the interface 29 between the two layers 30 and 31 of the load-carrying section 13.

It has been found that with such a formed compression section 12 of the belt 10, the combination of the layers 18 and 19 provides resistance to "squash" and "dishing" and will flex without crack formation in the toothed area 28 thereof. The lateral fibers 25 in the inner layer 19 of the compression section 12 provide as much "squash" resistance as possible while still maintaining the improved flexing characteristics that avoid cracking.

In addition, the softer stock in the bottom layer 19 of the belt 10 allows the belt 10 to distort in an easier manner and thereby causes the belt 10 to grip pulley sides better as it enters the pulley as well as release better as the belt 10 exits the pulley. This softer stock in the inner layer 19 of the belt 10 decreases the overall bending modulus of the belt cross-section whereby a small diameter load-carrying cord 16 can be utilized to carry the same load. Likewise, with a smaller bending modulus, the power consumption is less and because the softer stock grips better, a thinner belt can be made.

Therefore, it can be seen that by providing the layers 19, 18, 31, cord 16, layers 30 and 11 as well as the fabric layers 15 and 14, the belt 10 of this invention can be made by the method of this invention in a manner conventional in the art for forming endless power transmission belts of the cog-tooth type. For example, see the U.S. Pat. to Brooks et al, No. 3,464,989 and the aforementioned U.S. Pat. to Richmond, No. 3,473,989, for typical examples of conventional methods for making belts of the cog-tooth type whereby these two references are being incorporated into this disclosure by this reference thereto so that a further discussion of the method of bonding the various layers of the belt 10 together need not be further described.

While it has been found that the belt 10 formed in the manner previously described tends to prevent cracking in the toothed area 28 thereof for the reasons previously set forth, it may be found that the belt could be formed without any fiber loading of the various layers thereof and with or without the outer fabric layers 14 and inner fabric layer 15 as long as the roots of the teeth are disposed inboard of the interface between the inner and outer layers of the compression section.

For example, reference is made to FIG. 3 wherein another endless power transmission belt of the cog-tooth type of this invention is generally indicated by the reference numeral 10A and parts thereof similar to the belt 10 previously described are indicated by the same reference numerals followed by the reference letter "A".

As illustrated in FIG. 3, the belt 10A is formed substantially of polymeric materials and comprises a tension section 11A, a compression section 12A and a load-carrying section 13A disposed between the tension section 11A and the compression section 12A, the compression section 12A having an outer layer 18A and an inner layer 19A secured together and forming an interface 20A therebetween.

The load-carrying section 13A has load-carrying means in the form of the helically wound load-carrying cord 16A embedded in the polymeric cushion or matrix 17A which in the embodiment illustrated in FIG. 3 comprises a single layer. However, it is to be understood that the cushion 17A could comprise two layers in the same manner as the two layers 30 and 31 of the belt 10, if desired.

The inner surface 21A of the belt 10A is formed with alternating transverse teeth 22A and grooves 23A with the grooves 23A respectively defining the roots 24A of the teeth. As with the belt 10, the roots 24A of the teeth 22A of the belt 10A are disposed spaced from the interface 20A between the layers 18A and 19A and, preferably, are disposed inboard of the interface 20A a distance that is approximately 25% of the distance from the root 24A to the center of the load-carrying section 13A for the reasons previously set forth.

It is believed that by forming the inner layer 19A of softer material than the outer layer 18A of the compression section 12A of the belt 10A and by having the roots 24A of the teeth 21A disposed inboard of the interface 20A of the layers 18A and 19A in the manner illustrated in FIG. 3, the belt 10A will tend to resist cracking in the toothed area 28A for the reasons previously set forth without requiring fiber loading in any of the layers of the belt 10A. However, it is to be understood, that one or more of the layers of the belt 10A could be fiber loaded if desired.

Another endless power transmission belt of the cogtooth type to which the features of this invention can be utilized is generally indicated by the reference numeral 10B in FIG. 4 and parts thereof similar to the belts 10 and 10A previously described are indicated by like reference numerals followed by the reference letter "B".

As illustrated in FIG. 4, it can be seen that the belt 10B comprises a central neutral axis (CNA) belt wherein the load-carrying section 13B is disposed substantially midway between the outside surface 27B and inside surface 21B thereof with the belt 10B being formed in the manner well known in the art. For example, see the U.S. Pat. to Fisher et al, No. 3,987,684 which is being incorporated into this disclosure by this reference thereto for a detailed discussion of the method of making CNA belts so that a further discussion of the method of making the belt 10B of this invention need not be described except to further describe the layers thereof.

In particular, it can be seen that the CNA belt 10B has a tension section 11B secured by the load-carrying section 13B to the compression section 12B with the compression section 12B being formed of an outer layer 18B and an inner layer 19B in the manner previously described.

However, the tension section 11B is also formed from an inner layer and outer layer with inner layer being the same material as the layer 18B so that the inner layer of the tension section 11B is indicated by the reference numeral 18B'. Similarly, the outer layer of the tension section 11B is formed from the same material as the inner layer 19B and is thereby indicated by the reference numeral 19B'.

Thus, it can be seen that the outer layer 19B' of the tension section 11B is formed of softer material than the inner layer 18B' of the tension section 11B in the same manner that the inner layer 19B of the compression section 12B is formed of softer material than the outer layer 18B of the compression section 12B.

In addition, the belt 10B has an outer fabric layer 14B and an inner fabric layer 15B although none or one or more fabric layers can be utilized if desired.

The inner surface 21B of the belt 10B is in the form of alternating transverse teeth 22B and grooves 23B with the grooves 23B respectively defining the roots 24B of the teeth 22B. Likewise, the top surface or outer surface 27B of the belt 10B is in the form of alternating transverse teeth and grooves in the same manner as the teeth 22B and grooves 23B of the inner layer 21B so that the teeth of the outer surface 27B are indicated by the reference numeral 22B' and the grooves thereof are defined by the reference numeral 23B' which define the roots 24B' of the teeth 22B' in the manner previously described.

The roots 24B of the teeth 22B of the compression section 12B of the belt 10B are spaced from the interface 20B between the layers 18B and 19B for the reasons previously set forth whereby the roots 24B' of the teeth 23B' of the tension section 11A are disposed spaced from the interface 20B' between the layers 18B' and 19B' the same distance and for the same reasons as previously set forth.

In this manner, it can be seen that when the CNA belts 10B are formed so that every other belt thereof is being turned inwardly outwardly so as to dispose the smaller base of the resulting trapezoidal configuration thereof inwardly, a softer inner layer will always be provided in the resulting compression section thereof to tend to prevent cracking in the toothed area 28B or 28B' for the reasons previously set forth.

In view of the above, it can be seen that this invention not only provides an improved endless power transmission belt having a toothed compression section, but also this invention provides an improved method of making such a belt.

While the forms and method of this invention now preferred have been illustrated and described as required by the Patent Statute, it is to be understood that other forms and method steps can be utilized and still fall within the scope of the appended claims.

What is claimed is:

1. In an endless power transmission belt having a toothed compression section, said belt being formed substantially of polymeric materials and comprising a tension section, a compression section, and a load-carrying section disposed between said tension section and said compression section and having a transverse centerline, said compression section having an outer layer and an inner layer joined to said outer layer and defining an interface therewith that is substantially uniformly spaced from said load-carrying section by said outer layer throughout substantially the entire width and length of said belt, said compression section having an inner surface in the form of alternating transverse teeth and grooves with said grooves respectively defining the roots of said teeth, said inner layer of said compression section having a thickness from said interface to the tips of said teeth thereof that is approximately the same as the thickness of said outer layer of said compression section, the improvement wherein said inner layer of said compression section is softer than said outer layer thereof and said roots of said teeth are spaced inwardly from said interface of said layers so that said root of each tooth is spaced from said interface of said layers a distance that is approximately 25% of the distance of that root from said centerline of said load-carrying section whereby said inner layer tends to prevent cracking of said belt in the toothed area thereof, said belt being a CNA belt whereby said tension section is toothed and is formed from two layers in substantially the same manner as said toothed compression section except that the outer layer of said tension section is substantially the same as said inner layer of said compression section and the inner layer of said tension section is substantially the same as said outer layer of said compression section.

2. A belt as set forth in claim 1 wherein said outer layer of said compression section has a plurality of fibers therein.

3. A belt as set forth in claim 2 wherein said inner layer of said compression section has a plurality of fibers therein.

4. A belt as set forth in claim 3 wherein some of said fibers of said layers of said compression section are relatively long and are of substantially the same length.

5. A belt as set forth in claim 4 wherein said inner layer of said compression section has a larger number of said fibers that are relatively long and of substantially the same length as the number of such fibers in said outer layer thereof per unit volume of said layers.

6. A belt as set forth in claim 1 wherein said outer layer of said compression section has a Shore A durometer hardness of approximately 90 and said inner layer thereof has a Shore A durometer hardness of approximately 85.

7. A belt as set forth in claim 6 wherein said outer layer of said compression section has an approximately 2600 psi compressive modulus and an approximately 2200 psi bending modulus, said inner layer of said compression section having an approximately 2200 psi compressive modulus and an approximately 1700 psi bending modulus.

8. A belt as set forth in claim 1 wherein said belt has a substantially trapezoidal cross-sectional configuration so as to define a pair of non-parallel sides of said belt.

9. A belt as set forth in claim 8 wherein said pair of non-parallel sides of said belt are raw-edges, only said outer layer of said layers of said compression section having graphite therein to reduce friction at said raw-edges of said outer layer thereof.

10. In a method of making an endless power transmission belt having a toothed compression section and being formed substantially of polymeric materials, said method comprising the steps of providing a tension section, providing a compression section, disposing a load-carrying section between said tension section and said compression section, forming said compression section to have an outer layer and an inner layer joined to said outer layer and defining an interface therewith that is substantially uniformly spaced from said load-carrying section by said outer layer throughout substantially the entire width and length of said belt, forming said compression section to have an inner surface in the form of alternating transverse teeth and grooves with said grooves respectively defining the roots of said teeth, and forming said inner layer of said compression section to have a thickness from said interface to the tips of said teeth thereof that is approximately the same as the thickness of said outer layer of said compression section, the improvement comprising the steps of forming said inner layer of said compression section to be softer than said outer layer thereof, inwardly spacing said roots of said teeth from said interface of said layers so that said root of each tooth is spaced from said interface of said layers a distance that is approximately 25% of the distance of that root from the transverse centerline of said load-carrying section whereby said inner layer tends to prevent cracking of said belt in the toothed area thereof, and forming said belt to be a CNA belt whereby said tension section is toothed and is formed from two layers in substantially the same manner as said toothed compression section except that the outer layer of said tension section is substantially the same as said inner layer of said compression section and the inner layer of said tension section is substantially the same as said outer layer of said compression section.

11. A method of making a belt as set forth in claim 10 and including the step of forming said outer layer of said compression section to have a plurality of fibers therein.

12. A method of making a belt as set forth in claim 11 and including the step of forming said inner layer of said compression section to have a plurality of fibers therein.

13. A method of making a belt as set forth in claim 12 and including the step of forming some of said fibers of said layers of said compression section to be relatively long and be of substantially the same length.

14. A method of making a belt as set forth in claim 13 and including the step of forming said inner layer of said compression section to have a larger number of said fibers that are relatively long and of substantially the same length as the number of such fibers in said outer layer thereof per unit volume of said layers.

15. A method of making a belt as set forth in claim 10 and including the step of forming said outer layer of said compression section to have a Shore A durometer hardness of approximately 90 and said inner layer thereof to have a Shore A durometer hardness of approximately 85.

16. A method of making a belt as set forth in claim 15 and including the steps of forming said outer layer of said compression section to have an approximately 2600 psi compressive modulus and an approximately 2200 psi bending modulus and forming said inner layer of said compression section to have an approximately 2200 psi compressive modulus and an approximately 1700 psi bending modulus.

17. A method of making a belt as set forth in claim 10 and including the step of forming said belt to have a substantially trapezoidal cross-sectional configuration so as to define a pair of non-parallel sides of said belt.

18. A method of making a belt as set forth in claim 17 and including the steps of forming said pair of non-parallel sides of said belt to be raw-edged, and forming only said outer layer of said layers of said compression section to have graphite therein to reduce friction at said raw-edges of said ouer layer thereof.

* * * * *